United States Patent [19]

Avakian

[11] Patent Number: 4,616,042
[45] Date of Patent: Oct. 7, 1986

[54] LOW TEMPERATURE IMPACT MODIFIED THERMOPLASTIC FOAM

[75] Inventor: Roger W. Avakian, Brasschaat, Belgium

[73] Assignee: General Electric Company, Pittsfield, Mass.

[21] Appl. No.: 744,610

[22] Filed: Jun. 14, 1985

[51] Int. Cl.⁴ ............................................. C08J 9/06
[52] U.S. Cl. ...................................... 521/81; 521/79; 521/90; 521/138; 525/439; 525/464
[58] Field of Search ............... 525/439, 464; 521/138, 521/81, 79, 90

[56] References Cited

U.S. PATENT DOCUMENTS

| | | | |
|---|---|---|---|
| 4,097,425 | 6/1978 | Niznik | 521/138 |
| 4,155,898 | 5/1979 | Bopp | 525/439 |
| 4,161,469 | 7/1979 | LeGrand | 525/439 |
| 4,174,432 | 11/1979 | Niznik | 521/138 |
| 4,224,215 | 9/1980 | Macke | 525/464 |
| 4,243,575 | 1/1981 | Myers et al. | 260/37 |
| 4,337,192 | 6/1982 | Campbell | 523/212 |
| 4,397,973 | 8/1983 | Scott | 525/464 |
| 4,462,947 | 7/1984 | Huggard | 521/138 |
| 4,478,981 | 10/1984 | Arkles | 525/464 |

FOREIGN PATENT DOCUMENTS 2048286 4/1983 United Kingdom .

Primary Examiner—Morton Foelak
Attorney, Agent, or Firm—John W. Harbour; William F. Mufatti; Edward K. Welch, II

[57] ABSTRACT

The low temperature impact strength of foam thermoplastic articles is increased with the addition of polysiloxane-polycarbonate block copolymer.

8 Claims, No Drawings

LOW TEMPERATURE IMPACT MODIFIED THERMOPLASTIC FOAM

This invention relates to thermoplastic foam having improved low temperature impact strength. More particularly, this invention relates to thermoplastic foam having a polydiorganosiloxane-polycarbonate block copolymer impact modifier to enhance low temperature impact strength.

BACKGROUND OF THE INVENTION

Foam thermoplastic resins are finding increased utility in either extruded or injection molded plastic articles. Such foam resins provide articles having both strength and light weight.

Applicant's copending application U.S. Ser. No. 598,801 filed Apr. 10, 1984, now U.S. Pat. No. 4,544,677, teaches that known particulate impact modifiers may be used as nucleating agents in thermoplastic foams. However, the data contained therein also supports the fact that, in general, known impact modifiers for thermoplastic resins fail to have an appreciable impact modifying effect on thermoplastic foam.

It has now been discovered that certain foam thermoplastic resins can be impact modified at low temperature by use of polysiloxane-polycarbonate block copolymer resin as an impact modifier. The use of such impact modifier enables the production of foam thermoplastic articles with exceptional impact strength at low temperature.

DESCRIPTION OF THE INVENTION

Briefly, according to the present invention, there are provided foamed thermoplastic articles having improved low temperature impact strength molded or extruded from a thermoplastic blend comprising:
(a) at least one thermoplastic resin;
(b) an effective amount of polysiloxane-polycarbonate block copolymer to increase low temperature impact strength, and;
(c) and effective amount of blowing agent.
Preferably the blend additionally contains an effective nucleating agent.

Thermoplastic resins suitable for use herein include polyesters, polycarbonates, and poly(ester-carbonates). Preferred among these thermoplastic resins is polycarbonate.

Polycarbonate resins, suitable for use as a preferred thermoplastic resin mentioned herein are the aromatic polycarbonates prepared by reacting dihydric phenol with a carbonate precursor, such as phosgene, a haloformate or a carbonate ester. Preferably, the aromatic carbonate polymers have an intrinsic viscosity ranging form 0.30 to 1.0 dl./g. (measured in methylene chloride at 25° C.) By dihydric phenol is meant mononuclear or polynuclear aromatic compounds containing two hydroxy radicals, each of which is attached to a carbon atom of an aromatic nucleus. Typical dihydric phenols include 2,2-bis-(4-hydroxy-phenyl)propane; 2,2-bis-(3,5-dimethyl-4-hydroxyphenyl)propane, 4,4'-dihydroxydiphenyl ether, bis(2-hydroxyphenyl)methane, mixtures thereof and the like. The preferred aromatic carbonate polymer is a homopolymer derived from 2,2-bis(4-hydroxyphenol)propane, i.e. bisphenol-A. Suitable polycarbonate resins include, but are not limited to, those described in U.S. Pat. Nos. 3,161,615; 3,220,973; 3,312,659; 3,312,660; 3,313,777; 3,666,614; among others all of which are incorporated herein by reference.

Poly(ester-carbonates) preferred for use in the invention comprise recurring carbonate groups

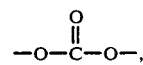

recurring carboxylate groups

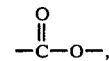

and aromatic carbocyclic groups in the linear polymer chain, in which at least some of the carboxylate groups and at least some of the carbonate groups are bonded directly to ring carbon atoms of the aromatic carbocyclic groups. These poly(ester-carbonate) copolymers, in general, are prepared by reacting a difunctional carboxylic acid, such a phthalic acid, isophthalic acid, terephthalic acid, the polynuclear aromatic acids, such a diphenic acid, 1,4-naphthalic acid, mixtures of any of the foregoing, and the like, with a dihydric phenol and a carbonate precursor, of the types described above. A particularly useful polyester carbonate is derived from bisphenol-A, isophthalic acid, terephthalic acid, or a mixture of isophthalic acid and terephthalic acid, or the reactive derivatives of these acids such as terephthaloyl dichloride, isophthaloyl dichloride, or a mixture thereof, and phosgene. The molar proportions of dihydroxy diaryl units to benzenedicarboxylate units to carbonate units can range from 1:0.2–1.00:0.80–0.00 and the molar range of terephthalate units to isophthalate units can range from 99:1 to 1:99 in this preferred family of resins. Additional examples of suitable poly(ester-carbonates) and methods of their manufacture are disclosed in U.S. Pat. Nos. 3,030,331; 3,169,121; 3,207,814; 4,156,069; 4,188,314; 4,194,038; and 4,324,869.

Polyester resins suitable for use as a preferred thermoplastic resin herein are derived from an aliphatic, aliphatic ether, or cycloaliphatic diol, or mixtures thereof, preferably containing from about 2 to about 10 carbon atoms, and one or more aromatic or cycloaliphatic dicarboxylic acids. Suitable aliphatic diols are represented by, for example, ethylene glycol, propylene glycol, butylene glycol, 2-methyl-1,3-propylene glycol, etc. Suitable aliphatic ether glycols are polyalkylene ether glycols where the alkylene portion has from 2–10 carbon atoms and the entire glycol portion varies in molecular weight from about 100 to about 10,000. Suitable cycloaliphatic diols, are represented by, for example, 1,4-cyclohexanedimethanol. Suitable aliphatic diacids are sebacic acid, adipic acid, etc. and mixtures thereof. Suitable aromatic dicarboxylic acids are isophthalic or terephthalic acid, 1,2-di(p-carboxyphenyl)ethane, 4,4'-diphenyldicarboxylic acid, 4,4'-diphenoxyethane-dicarboxylic acid, p-hydrobenzoic acid, etc., and mixtures thereof.

A preferred polyester which is aliphatic diol and an aromatic dicarboxylic acid is prepared, for example, by condensing either the cis- or trans-isomer (or mixtures thereof) of, for example 1,4-cyclohexanedimethanol with an aromatic dicarboxylic acid. More specifically, this polyester may be derived from the reaction of either the cis- or trans-isomer (or a mixture thereof) of 1,4-cyclohexanedimethanol with a mixture of isophthalic or terephthalic acids.

Another preferred polyester is a copolyester derived from a cyclohexanedimethanol, and alkylene glycol and an aromatic dicarboxylic acid. These copolyesters are prepared by condensing either the cis- or trans-isomer (or mixtures thereof) of, for example 1,4-cyclohexanedimethanol and an alkylene glycol with an aromatic dicarboxylic acid to produce a copolyester. More specifically, such copolyester may be derived from the reaction of either the cis- or trans-isomer (or mixtures thereof) of 1,4-cyclohexanedimethanol and ethylene glycol with terephthalic acid in a molar ratio of 80:20:100.

The most preferred polyester is derived from an alkylene glycol of from 2 to 4 carbon atoms and an aromatic dicarboxylic acid. More particularly, this polyester is poly(ethylene terephthalate) or poly(butylene terephthalate).

The polyesters described herein are either commercially available or they can be produced by methods known in the art, including those set forth in U.S. Pat. No. 2,801,466. The polyester employed in the practice of this invention will usually have an intrinsic viscosity of from about 0.4 to about 2.0 dl./g., as measured in a solvent at 23° C.–30° C.

The polysiloxane-polycarbonate block copolymers can be expressed by the average formula

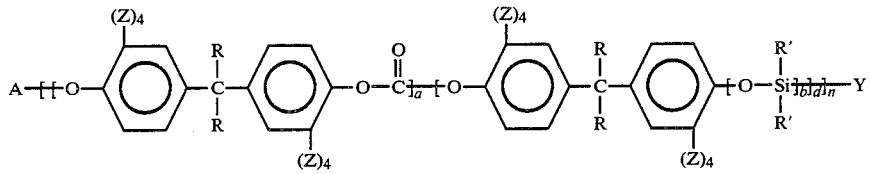

where n is at least 1, and preferably n is an integer equal to from 1 to about 1,000, inclusive, a is equal to from 1 to about 200, inclusive, b is equal to from about 5 to about 200, inclusive, and preferably b has an average value from about 15 to about 90, inclusive, the ratio of a to b can vary from about 0.05 to about 3, inclusive, but when b has an average value of from about 15 to about 90, inclusive, the ratio of a to b is preferably from about 0.067 to about 0.45, inclusive, d is 1 or more, Y is

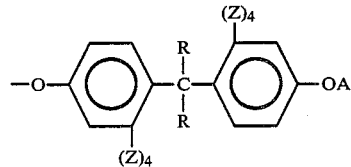

A is a member selected from the class of hydrogen and

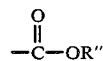

R is a member selected from the class of hydrogen, monovalent hydrocarbon radicals and halogenated monovalent hydrocarbon radicals, R' is a member selected from the class of monovalent hydrocarbon radicals, halogenated monovalent hydrocarbon radicals and cyanoalkyl radicals, R" is a member selected from the class consisting of monovalent hydrocarbon radicals and halogenated hydrocarbon radicals, and Z is a member selected from the class of hydrogen, lower alkyl radicals and halogen radicals and mixtures thereof.

Included within the radicals represented by R are aryl radicals and halogenated aryl radicals such as phenyl, chlorophenyl, xylyl, tolyl, etc.; aralkyl radicals such as phenylethyl, benzyl, etc.; aliphatic, haloaliphatic and cycloaliphatic radicals such as alkyl, alkenyl, cycloalkyl, haloalkyl including methyl, ethyl, propyl, chlorobutyl, cyclohexyl, etc; R can be all the same radical or any two or more of the aforementioned radicals, R is preferably methyl. R' includes all radicals included by R above except hydrogen, where R' can also be all the same radical or any two or more of the aforementioned R radicals except hydrogen, and R' is preferably methyl. R' includes all radicals included by R above except hydrogen, where R' can also be all the same radical or any two or more of the aforementioned R radicals except hydrogen, cyanoalkyl radicals such as cyanoethyl, cyanobutyl, etc. radicals. Radicals that are included within the definition of Z are hydrogen, methyl, ethyl, propyl, chloro, bromo, iodo, etc. and combinations thereof, and Z is preferably hydrogen.

The hydrolytically stable copolymers of the present invention can be further described as comprising recurring copolymeric units of a polydiorganosiloxane joined by substituted aryloxy-silicon linkages to a polyester of dihydric phenol and a precursor of carbonic acid, where each of said recurring copolymeric units comprises by average weight from about 10% to about 75% of said polydiorganosiloxane, and preferably from about 40 to 70% by weight.

The above copolymers can be produced by reacting at temperatures in the range of 0° C. to 100° C., preferably 20° C. to 50° C., and in the presence of an acid acceptor, a mixture of a halogen chain-stopped polydiorganosiloxane having the formula

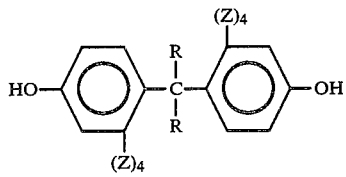

and a dihydric phenol having the formula and thereafter phosgenating said reaction product until the resulting copolymer achieves a maximum intrinsic viscosity, where R, R', Z and b are as defined above, and X is a halogen radical, preferably chloro.

The halogen chain-stopped polydiorganosiloxanes can be made by conventional procedures such as by the controlled hydrolysis of a diorganodihalosilane, for example, dimethyldichlorosilane as taught in Patnode U.S. Pat. No. 2,381,366 and Hyde U.S. Pat. Nos. 2,629,726 and 2,902,507.

Another procedure that can be employed involves equilibrating a mixture of a diorganodichlorosilane and a cyclic polydiorganosiloxane in the presence of a metal catalyst such as ferric chloride as shown in Sauer U.S. Pat. No. 2,421,653. Although the various procedures utilized in forming the halogen chain-stopped polysiloxane are not critical, generally it has been found desirable to maintain the halogen content of the resulting halogen chain-stopped polysiloxane in the range of about 0.4 to about 35% by weight, and preferably from about 1 to about 10% by weight of said halogen chain-stopped polysiloxane. The halogen chain-stopped polysiloxane is preferably in the form of a chlorinated polydimethylsiloxane.

Dihydric phenols that are included in Formula 5 are, for example, 2,2-bis(4-hydroxyphenol)-propane (bisphenol-A); 2,4'-dihydroxydiphenylmethane; bis-(2-hydroxyphenyl)-methane; bis-(4 hydroxyphenyl)-methane; 1,1-bis-(4-hydroxyphenyl)-ethane; 1,2-bis-(4-hydroxyphenyl)-ethane; 1,1-bis-(4-hydroxy-2-chlorophenyl)-ethane; 1,1-bis-(2,5-dimethyl-4-hydroxyphenyl)-ethane; 1,3-bis-(3-methyl-4-hydroxyphenyl)-propane; 2,2-bis-(3-isopropyl-4-hydroxyphenyl)-propane etc. Mixtures can also be used. Others will occur to those skilled in the art.

These copolymers essentially comprise recurring units consisting of a polydiorganosiloxane interconnected by substituted aryloxy-silicone linkages to a polyester of carbonic acid precursor and a dihydric phenol.

Materials of the above nature are also described in U.S. Pat. Nos. 3,189,662 and 3,821,325 included herein by reference and can be used either alone as such or in conjunction with well known modifiers to provide particular desired characteristics.

Illustrative of the above block copolymers is General Electric LR-3320. This material has a specific gravity of 1.12, tensile strength of 2500 to 3900 psi, an elongation of 230 to 430, a tear strength (Die C) of 400 lbs/in., and a brittleness temperature below −76° F. and a heat deflection temperature (10 mils under 66 psi Load) of 160° F.

Another such block copolymer, specifically General Electric LR-4020, has a refractive index of 1.506, a tensile strength of 1810 to 2290 psi, an elongation of 530–580%, and a brittleness temperature below −76° F.

Persons skilled in the art can easily determine proper and effective amounts of polysiloxane-polycarbonate block copolymer for use as an impact modifier in the thermoplastic blends herein. Generally, however, the weight ratio of such impact modifier to other thermoplastic resins in the thermoplastic blend should vary from about 1/100 to about ½ and preferably from about 1/50 to about 1/6. Herein, an effective amount of impact modifier is that amount which will appreciably raise low temperature impact strength, i.e., impact strength at approximately −40° C.

The blowing agents suitable for use in or with the thermoplastic resin blend include gases which expand upon the release of pressure to foam the resin composition, liquids which will vaporize to a gas and expand the resin upon the release of pressure, solids which decompose to release a gas, and combinations of such gases, liquids, and solids. Examples of suitable normally gaseous agents which can be used are paraffins such as propane or butane and more permanent gases such as nitrogen, carbon dioxide, and air. Similarly, olefins such as ethylene, propylene, butylene, etc., and mixtures thereof can be used to advantage. Suitable normally liquid blowing agents include methyl chloride, higher paraffins such as pentane or hexane, freons, etc. Examples of suitable solids which upon decomposition release a gas are ammonium or azo type compounds, such as ammonium carbonate, ammonium bicarbonate, potassium bicarbonate, diazoaminobenzene, diazoaminotoluene, azodicarbonamide, diazoisobutyronitrile, etc. Preferably, the blowing agent is a dihydrooxadiazinone or 5-phenyl tetrazole. The amount of foaming agent used depends upon the volume of gas it will generate and the foam density required.

The foaming agent, for instance, 5-phenyl tetrazole and/or PDOX, may be combined with the thermoplastic resin blend either prior to or at the instant of the actual foaming of the resin in an amount sufficient to result in the desired degree of foaming. Preferably, the foaming agent is premixed with the thermoplastic resin blend while in granular or particulate form and activated by the application of heat to the resin particles. In the case of solids which decompose to produce a gas, effective amounts of blowing agent to obtain a fine uniform cell structure are generally present where the blowing agent has a weight ratio to thermoplastic resin in the thermoplastic blend ranging from about 1/1000 to 1/50.

Suitable nucleating agents are particulate or fibrous materials which may additionally perform other functions such as that of filler or reinforcing agent in addition to the function of nucleating. Common nucleating agents include ammonium bromide, ammonium sulfate, carbon black, magnesium silicate, perlite, bentonite, talc, barium sulfate, mica, hydrated salts, silica, glass fiber, etc.

Preferred as the nucleating agent herein is amorphous silica. These differ from silicas of the mineral type, which are mainly used in the form of quartz and glass as fillers.

Amorphous, i.e., non-crystalline silicas are typically used in generally small amounts, to achieve special effects. They are made by well known processes, such as one of the pyrogenic processes, i.e., the AEROSIL process in which silicon tetrachloride is mixed with hydrogen and oxygen at 1000° C. or higher, or the electric arc process in which quartz and coke are heated at 1500° C. or above and the SiO and CO which are formed thereby are further reacted with atmospheric oxygen. Wet processes are also useful to prepare silicas suitable for use herein, i.e., a precipitation process in which sodium water glass and sulfuric acid are stirred and silica precipitates, or a hydrothermal process, in which quartz is heated with lime under pressure at 180° C., and the calcium silicate is mixed with hydrochloric acid. In all cases, the silica is obtained in a highly dispersed, i.e., very finely divided form. They are not crystalline, but are amorphous, as determined by X-rays. Silicas suitable for the present method are available from a number of commercial sources. The most important characteristics appear to be average primary particle size, which is measured in conventional ways, and expressed in microns (or nanometers, nm); compacted apparent density, measured according to Standard Test Method DIN 53 194 or ISO 787-11; and expressed in g./l., and pH-value, measured according to Standard Test Method DIN 53 200 or ASTM D 1208-65, and expressed in pH units measured on a 5% aqueous suspension. In accordance with conventional practice, the silicas can be surface treated with silanes, silicones, and the like.

Persons skilled in the art can readily determine an effective amount of nucleating agent to obtain a fine uniform, cell structure. Generally, the weight ratio of nucleating agent to thermoplastic constituent in the blend ranges from about 1/1000 to about 1/25.

The thermoplastic blend of this invention may further contain one or more reinforcing agents. Typical reinforcing agents useful for the invention include but are not limited to, glass fiber, talc, mica or combinations thereof.

Suitable glass fiber is well known to those skilled in the art and is widely available from a number of manufacturers. For compositions ultimately to be employed for electrical uses, it is preferred to use fibrous glass filaments comprised of lime-aluminum borosilicate glass that is relatively soda-free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastic reinforcement are made by mechanical pulling. The filament diameters range from about 0.00012 to 0.00075 inch but this is not critical to the present invention.

The length of the glass filaments and whether or not they are bundled into fibers and the fibers bundled in turn to yarns, ropes or rovings, or woven into mats and the like are also not critical to the invention. However, in preparing the molding compositions it is convenient to use the filamentous glass in the form of chopped strands of from about ⅛" to about 2" long. In articles molded from the compositions on the other hand, even shorter lengths will be encountered because, during compounding considerable fragmentation will occur. This is desirable, however, because the best properties are exhibited by thermoplastic injection molded articles in which the filament lengths lie between about 0.000005" and 0.125 (⅛").

In general, best properties will be obtained if the filamentous glass reinforcement comprises from about 2.5 to about 40% by weight based on the combined weight of glass and resin, and preferably from about 5 to about 30% by weight. Generally, for direct molding use, up to about 60% of glass can be present without causing flow problems. However, it is useful also to prepare the compositions containing substantially greater quantities, e.g., up to 80-90% by weight of glass. These concentrates can be custom blended with resins that are not glass reinforced to provide any desired glass content of a lower value.

For many uses, it is preferred that the thermoplastic blend of the present invention also contain a flame retardant package. The choice of a particular flame retardant package is dependent upon the thermoplastic resin of the blend. Generally, the flame retardant package contains a aromatic bromine compound and an antimony containing compound. Suitable aromatic bromine compounds include those described in U.S. Pat. No. 3,751,396, which is incorporated herein by reference. Examples of such compounds are decabromodiphenylether, octabromodiphenyl ether, pentabromoethylbenzene, hexabromobenzene, 2,2-bis(3,5-dibromo-4-hydroxyphenyl)propane, tetrabromophthalic anhydride, octabromobiphenyl, decabromobiphenyl, and 3,5,3', 5'-tetrabromobiphenyl ether. Also suitable are brominated polymers and oligomers such as aromatic polycarbonates having bromine substituents on the phenylene rings, aromatically brominated polystyrenes, and brominated benzyl esters of polyacrylate. Suitable antimony compounds include both inorganic and organic compounds such as those described in U.S. Pat. No. 3,833,685. It is well within the skill of the art to select suitable flame retardant packages and effective amounts thereof for a given thermoplastic resin.

The thermoplastic blend of the present invention may also contain other filler and additives including antioxidants, stabilizers, mold release agents, waxes, dyes, pigments, etc.

Although it is not essential, best results are obtained if the hereinabove described optional and required ingredients are precompounded, pelletized, and foam molded. Precompounding can be carried out in conventional equipment. For example, the thermoplastic resin, polysiloxane-polycarbonate block-copolymer, and other optional and required ingredients are fed to a single screw extruder, the screw employed having a long transition section to insure proper melting, wherein they are blended, extruded, and chopped into granules, pellets, etc., by standard techniques. Of course, the resultant pellet may or may not contain blowing agent generally depending on whether a solid, liquid, or gaseous blowing agent is to be employed. In cases where the resultant pellet contains blowing agent, extrusion must be performed at temperatures below the activation temperature of the agent. In cases where the pellet is brought into contact with the solid, liquid, or gaseous agent in the mold barrel, or at the instant of foaming, extrusion may be performed at suitable temperatures for the thermoplastic.

The thermoplastic blend may be foamed by any of the common techniques in either an injection molding or extrusion operation. Generally, such techniques involve heating the polycarbonate resin composition until it is in melt form and injecting the melt into a die cavity or extruding the melt through a die head with an activated blowing agent. One skilled in such techniques can easily prescribe more specific methods and conditions for foaming the thermoplastic blend.

PREFERRED EMBODIMENTS OF THE INVENTION

Thus has been described a thermoplastic blend for foam molding articles having improved low temperature impact strength. In order to more fully and clearly illustrate the invention, the following examples are offered by way of illustration and not by way of limitation.

TEST

Falling Dart Impact Test is an in house test of General Electric Company for foamed thermoplastic resins similar in apparatus and report to ASTM D-2444. A brief description of the test follows:

APPARATUS (a) 10 pound dart with steel tup having a ½" radius head
(b) beveled 4" diameter ring sample guide with 1¾" diameter center hole (c) free-fall, non-restrictive tube used to guide the dart and calibrated to measure the height of the dart in foot-pounds (d) rope and pulley to lift and control the dart

PROCEDURE (1) Sample size is ¼" thickness and minimum of 5"×5" length and width.
(2) Condition samples at desired temperature for 4–8 hours.
(3) Repeat steps 4–9, for 20 samples.
(4) Pre-center the dart tup over the sample ring.
(5) Place sample on sample ring.
(6) Release the dart from a preselected height.
(7) Inspect sample for failure.
(8) If sixth consecutive pass/fail, repeat Step 3.
(9) If failure/pass occurs, accordingly decrease/increase the subsequent impact energy 2.5 ft-lbs.

FAILURE (a) complete fracture of sample
(b) puncture of sample
(c) cracking of the sample on the side opposite impact where the edges of such cracks or rifts having heights greater than 0.010" above the surface of the sample.

REPORT (a) mean impact force of the mean of all pass/fail or fail/pass sequences
(b) test temperature
(c) density of sample.

EXAMPLES 1–6

Formulations were compounded by dry blending the components followed by extrusion into resin pellets on a vented, one inch single screw Haake Buchler extruder with a length diameter ratio of 25/1. Generally, the polycarbonate powder was not dried prior to extrusion. Melt temperature during the extrusion was 296° C. Prior to molding, the resin pellets were premixed with blowing agent concentrate at a 5/95 blowing agent concentrate/polycarbonate resin pellet weight ratio. The blowing agent resin concentrate contains 5% by weight of the blowing agent in poly(bisphenol-A carbonate). Prior to molding, the pellet mix was dried at 110° C. for four hours. After drying, the pellets were foam molded at a melt and mold temperature of 304° C. and 82° C. respectively, to a density of 0.90 g./cc. into test plaques (5½"×11"×¼").

| | 1 | 2 | 3 | 4 | 5 | 6 |
|---|---|---|---|---|---|---|
| Poly(bisphenol-A carbonate) | 100 | 100 | 100 | 100 | 100 | 100 |
| blowing agent[1] | 0.25 | 0.25 | 0.25 | 0.25 | 0.25 | 0.25 |
| nucleating agent[2] | 0.5 | 0.5 | 0.5 | 0.5 | 0.5 | 0.5 |
| KRATON G resin[3] | — | 10 | — | — | — | — |
| ACRYLOID KM653 resin[4] | — | — | 10 | — | — | — |
| ACRYLOID KM330 resin[5] | — | — | — | 10 | — | — |
| LR-3320 resin[6] | — | — | — | — | 10 | 5 |
| Falling Dart Impact 25° C. (ft-lbs.) | 88.0 | 86.3 | * | 59.6 | 74.7 | 88.8 |
| Falling Dart Impact −40° C. (ft-lb.) | 25.9 | 23.8 | * | 25.9 | 53.8 | 44.8 |

[1]5-phenyl-3,6-dihydro-1,3,4-oxadiazin-2-one
[2]CABOSIL N70-TS, hydrophobic fumed silica, Cabot Corp., Boston, MA
[3]Hydrogenated styrene-butadiene-styrene block copolymer, Shell Oil Company
[4]Core-shell styrene-butadiene copolymer rubber, Rohm and Haas Company
[5]Core-shell acrylic rubber, Rohm and Haas Company
[6]Polyorganosiloxane-polycarbonate block copolymer, General Electric Company
*Degraded

What is claimed is:

1. A thermoplastic blend comprising:
   (i) at least one thermoplastic resin selected from the group consisting of polyester, polycarbonates and poly(ester-carbonates);
   (ii) an effective amount of polysiloxane-polycarbonate block copolymer to increase low temperature impact strength; and
   (iii) an effective amount of blowing agent.

2. The thermoplastic blend of claim 1 which additionally contains an effective amount of a suitable nucleating agent.

3. The thermoplastic blend of claim 1 in which said polysiloxane-polycarbonate block copolymer has a weight ratio to said at least one thermoplastic resin ranging from about 1/100 to about ⅓.

4. A foamed thermoplastic article comprising:
   (i) at least one thermoplastic resin selected from the group consisting of polyester, polycarbonates and poly(ester-carbonates);
   (ii) an effective amount of polysiloxane-polycarbonate block copolymer to increase low temperature impact strength; and
   (iii) the reaction or gaseous residue of an effective amount of blowing agent.

5. The foamed thermoplastic article of claim 4 which additionally comprises an effective amount of a suitable nucleating agent.

6. The foamed thermoplastic article of claim 4 in which said polysiloxane-polycarbonate block copolymer has a weight ratio to said at least one thermoplastic resin ranging from about 1/100 to about ⅓.

7. A method for improving the low temperature impact strength of articles foam molded or foam extruded from a composition containing a blowing agent and comprising at least one thermoplastic resin selected from the group consisting of polyester polycarbonates and poly(ester-carbonates), which method comprises the step of melt blending an effective amount of polysiloxane-polycarbonate block copolymer with said composition to produce a thermoplastic blend prior to a foam molding or foam extrusion step.

8. The method of claim 7 wherein said polysiloxane-polycarbonate block copolymer is melt blended with said at least one thermoplastic resin in a weight ratio ranging from about 1/100 to about ⅓.

* * * * *